(12) United States Patent
Chen et al.

(10) Patent No.: US 10,772,047 B2
(45) Date of Patent: Sep. 8, 2020

(54) TRANSMISSION POWER SHARING BETWEEN DUAL CONNECTIVITY CELL GROUPS

(71) Applicant: FUJITSU LIMITED, Kawasaki-shi, Kanagawa (JP)

(72) Inventors: Hongyang Chen, Kawasaki (JP); Jianming Wu, Kawasaki (JP); Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/366,525

(22) Filed: Mar. 27, 2019

(65) Prior Publication Data

US 2019/0223115 A1 Jul. 18, 2019

Related U.S. Application Data

(63) Continuation of application No. PCT/JP2017/029146, filed on Aug. 10, 2017.

(51) Int. Cl.
| | |
|---|---|
| *H04W 52/34* | (2009.01) |
| *H04W 72/04* | (2009.01) |
| *H04W 76/27* | (2018.01) |
| *H04W 76/15* | (2018.01) |
| *H04W 52/36* | (2009.01) |
| *H04W 52/14* | (2009.01) |

(52) U.S. Cl.
CPC ......... *H04W 52/34* (2013.01); *H04W 52/146* (2013.01); *H04W 52/346* (2013.01); *H04W 52/367* (2013.01); *H04W 72/044* (2013.01); *H04W 76/15* (2018.02); *H04W 76/27* (2018.02)

(58) Field of Classification Search
CPC ..... H04W 52/04; H04W 52/14; H04W 52/28; H04W 52/34; H04W 72/044; H04W 76/15; H04W 76/27
USPC ........................................................ 455/522
See application file for complete search history.

(56) References Cited

U.S. PATENT DOCUMENTS

| | | | |
|---|---|---|---|
| 2011/0207493 A1 | 8/2011 | Taoka et al. | |
| 2013/0040689 A1 | 2/2013 | Iwai et al. | |
| 2015/0327243 A1 | 11/2015 | Yin et al. | |
| (Continued) | | | |

FOREIGN PATENT DOCUMENTS

| | | |
|---|---|---|
| JP | 2010-50936 A | 3/2010 |
| JP | 2013-255278 A | 12/2013 |
| (Continued) | | |

OTHER PUBLICATIONS

International Search Report and Written Opinion of the International Searching Authority issued by the Japan Patent Office for corresponding International Patent Application No. PCT/JP2017/029146, dated Oct. 24, 2017, with an English translation.

(Continued)

*Primary Examiner* — Philip Sobutka
(74) *Attorney, Agent, or Firm* — Myers Wolin, LLC

(57) ABSTRACT

A terminal device includes a processor circuitry and a receiver. The processor circuitry is configured to perform dual connectivity with a cell group and a different cell group, and to control transmission power sharing between the cell group and the different cell group. The receiver is configured to receive a signal on the cell group and the different cell group.

6 Claims, 13 Drawing Sheets

(56) References Cited

U.S. PATENT DOCUMENTS

| | | | |
|---|---|---|---|
| 2017/0142668 A1* | 5/2017 | Takeda | H04W 52/34 |
| 2017/0164299 A1* | 6/2017 | Shimezawa | H04W 16/32 |
| 2018/0199315 A1* | 7/2018 | Hong | H04W 76/15 |

FOREIGN PATENT DOCUMENTS

| | | |
|---|---|---|
| JP | 2016-178688 A | 10/2016 |
| JP | 2016-195413 A | 11/2016 |
| WO | 2016/002393 A1 | 1/2016 |

OTHER PUBLICATIONS

3GPP TS 36.211 V14.2.0, "3rd Generation Partnership Project; Technical Specification Group Radio Access Network; Evolved Universal Terrestrial Radio Access (E-UTRA); Physical channels and modulation (Release 14)", Mar. 2017.

3GPP TS 36.212 V14.2.0, "3rd Generation Partnership Project; Technical Specification Group Radio Access Network; Evolved Universal Terrestrial Radio Access (E-UTRA); Multiplexing and channel coding (Release 14)", Mar. 2017.

3GPP TS 36.213 V14.2.0, "3rd Generation Partnership Project; Technical Specification Group Radio Access Network; Evolved Universal Terrestrial Radio Access (E-UTRA); Physical layer procedures (Release 14)", Mar. 2017.

3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Mar. 2017.

3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification (Release 14)", Mar. 2017.

3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification (Release 14)", Mar. 2017.

3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification (Release 14)", Mar. 2017.

3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)", Mar. 2017.

3GPP TS 36.413 V14.2.0, "3rd Generation Partnership Project; Technical Specification Group Radio Access Network; Evolved Universal Terrestrial Radio Access Network (E-UTRAN); S1 Application Protocol (S1AP) (Release 14)", Mar. 2017.

3GPP TS 36.423 V14.2.0, "3rd Generation Partnership Project; Technical Specification Group Radio Access Network; Evolved Universal Terrestrial Radio Access Network (E-UTRAN); X2 application protocol (X2AP) (Release 14)", Mar. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.0.0, "3rd Generation Partnership Project; Technical Specification Group Radio Access Network; Study on New Radio Access Technology Physical Layer Aspects (Release 14)", Mar. 2017.

3GPP TR 38.803 V14.0.0, "3rd Generation Partnership Project; Technical Specification Group Radio Access Network; Study on New Radio Access Technology; RF and co-existence aspects (Release 14)", Mar. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V14.2.0, "3rd Generation Partnership Project; Technical Specification Group Radio Access Network; Study on channel model for frequency spectrum above 6 GHz (Release 14)", Dec. 2016.

3GPP TR 38.912 V14.0.0, "3rd Generation Partnership Project; Technical Specification Group Radio Access Network; Study on New Radio (NR) access technology (Release 14)", Mar. 2017.

3GPP TR 38.913 V14.2.0, "3rd Generation Partnership Project; Technical Specification Group Radio Access Network; Study on Scenarios and Requirements for Next Generation Access Technologies; (Release 14)", Mar. 2017.

NTT DOCOMO, "New SID Proposal: Study on New Radio Access Technology", Agenda Item: 9.1, 3GPP TSG-RAN Meeting #71, RP-160671, Göteborg, Sweden, Mar. 7-10, 2016.

Huawei et al., "On multiple carrier operation", Agenda Item: 7.1.4.3, 3GPP TSG-RAN WG1 Meeting #87, R1-1611200, Reno, USA, Nov. 14-18, 2016.

LG Electronics, "Discussion on support of CA operation for NR", Agenda Item: 7.1.4.3, 3GPP TSG-RAN WG1 Meeting #87, R1-1611848, Reno, USA, Nov. 14-18, 2016.

Huawei et al, "Low frequency assisted high frequency operation", Agenda Item: 8.1.6, 3GPP TSG-RAN WG1 Meeting #86, R1-166114, Gothenburg, Sweden, Aug. 22-26, 2016.

Nokia et al., "UL Interference Coordination and Power Control", Agenda Item: 8.1.4.5, 3GPP TSG-RAN WG1 Meeting #86-BIS, R1-1610281, Lisbon, Portugal, Oct. 10-14, 2016.

Notice of Reasons for Refusal issued for corresponding Japanese Patent Application No. 2018-568996, dated Oct. 15, 2019, with full English machine translation attached.

Notice of Reasons for Refusal issued for corresponding Japanese Patent Application No. 2018-568996, dated Dec. 10, 2019, with full English machine translation attached.

Intel Corporation, "Power sharing mechanism for NR dual connectivity", Agenda Item: 5.1.9.1, 3GPP TSG-RAN WG1 NR Ad-Hoc #2, R1-1710585, Qingdao, P.R. China, Jun. 27-30, 2017.

Decision of Dismissal of Amendment issued for corresponding Japanese Patent Application No. 2018-568996, dated Jun. 2, 2020, with full English machine translation attached.

The extended European search report with supplementary European search report and European search opinion, issued by the European Patent Office for corresponding European Patent Application No. 17921218.8, dated Jul. 3, 2020.

Mediatek Inc: "UL Power Sharing for LTE-NR Dual Connectivity", Agenda Item: 5.1.9.1, 3GPP TSG RAN WG1 Meeting #ADHOC, R1-1710839, Qingdao, P.R. China, Jun. 27-30, 2017.

Huawei et al: "Power control for CA and DC", Agenda Item: 5.1.9.1, 3GPP TSG RAN WG1 NR Ad Hoc Meeting, R1-1709949, pp. 1-7, Qingdao, China, Jun. 27-30, 2017.

<Kyocera: "RLM and RLF in inter-eNB CA", Agenda Item: 7.2.1, 3GPP TSG-RAN WG2 Meeting #85, R2-140697, pp. 1-3, Prague, Czech Republic, Feb. 10-14, 2014.

* cited by examiner

TRANSMISSION POWER SHARING BETWEEN DUAL CONNECTIVITY CELL GROUPS

CROSS-REFERENCE TO RELATED APPLICATION

This application is a continuation of International Application No. PCT/JP2017/029146, filed on Aug. 10, 2017 and designating the U.S., the entire contents of which are incorporated herein by reference.

FIELD

The present invention relates to a terminal device, a base station device, a wireless communication system, and a wireless communication method.

BACKGROUND

In current networks, traffic of terminal devices, such as mobile terminals (smartphones and feature phones), accounts for most of network resources. In addition, traffic used by the mobile terminals tends to increase continuously.

Meanwhile, with the development of Internet of things (IoT) services (for example, transportation systems, smart meters, and monitoring systems for devices and the like), there is a demand to cope with services that have various requirements. Therefore, in the communication standards for next generation (for example, the fifth generation mobile communication (5G)), technologies that realize a higher data rate, a larger capacity, and a lower latency are desired, in addition to the standard technologies of the fourth generation mobile communication (4G) (for example, see Non Patent Literatures 1 to 11). As for the next generation communication standards, working groups of the 3GPP (for example, TSG-RAN WG1, TSG-RAN WG2, and the like) have been examining technologies (Non Patent Literatures 12 to 21).

As described above, to cope with a wide variety of services, in the 5G, a large number of use cases that are classified into enhanced mobile broadband (eMBB), massive machine type communications (MTC), and ultra-reliable and low latency communication (URLLC) are supposed to be supported. Among them, URLLC is a use case that is most difficult to be realized. First, there is a requirement for ultra-high reliability such that a target over-the-air block error rate is $10^{-5}$. As one method of realizing the ultra-high reliability, there is a method of increasing the amount of resources to be used and ensuring data redundancy. However, the wireless resources are limited, and it is impossible to increase the resources to be used without any limitation.

As for a low-latency, there is a requirement in URLLC such that a target over-the-air uplink and downlink user plane latency is 0.5 milliseconds. This is a high requirement to achieve one-tenth or lower than that of the 4G long term evolution (LTE) wireless system. In URLLC, it is necessary to simultaneously meet the two requirements of ultra-high reliability and low-latency as described above.

In 5G, studies are now being conducted to perform scheduling in units of short transmission time intervals (TTI) for communications in which low-latency is highly demanded (for example, URLLC). Further, studies are now being conducted to perform scheduling in units of long TTIs for data for which low-latency is less demanded and which has a large data size (for example, eMMB data).

Non Patent Literature 1: 3GPP TS 36.211 V14.2.0 (2017-03)
Non Patent Literature 2: 3GPP TS 36.212 V14.2.0 (2017-03)
Non Patent Literature 3: 3GPP TS 36.213 V14.2.0 (2017-03)
Non Patent Literature 4: 3GPP TS 36.300 V14.2.0 (2017-03)
Non Patent Literature 5: 3GPP TS 36.321 V14.2.0 (2017-03)
Non Patent Literature 6: 3GPP TS 36.322 V14.0.0 (2017-03)
Non Patent Literature 7: 3GPP TS 36.323 V14.2.0 (2017-03)
Non Patent Literature 8: 3GPP TS 36.331 V14.2.0 (2017-03)
Non Patent Literature 9: 3GPP TS 36.413 V14.2.0 (2017-03)
Non Patent Literature 10: 3GPP TS 36.423 V14.2.0 (2017-03)
Non Patent Literature 11: 3GPP TS 36.425 V14.0.0 (2017-03)
Non Patent Literature 12: 3GPP TR 38.801 V14.0.0 (2017-03)
Non Patent Literature 13: 3GPP TR 38.802 V14.0.0 (2017-03)
Non Patent Literature 14: 3GPP TR 38.803 V14.0.0 (2017-03)
Non Patent Literature 15: 3GPP TR 38.804 V14.0.0 (2017-03)
Non Patent Literature 16: 3GPP TR 38.900 V14.2.0 (2016-12)
Non Patent Literature 17: 3GPP TR 38.912 V14.0.0 (2017-03)
Non Patent Literature 18: 3GPP TR 38.913 V14.2.0 (2017-03)
Non Patent Literature 19: "New SID Proposal: Study on New Radio Access Technology", NTT docomo, RP-160671, 3GPP TSG RAN Meeting #71, Goteborg, Sweden, 7.-10. Mar. 2016
Non Patent Literature 20: "On multiple carrier operation", Huawei, HiSillicon, R1-1611200, 3GPP TSG-RAN WG1 Meeting #87, Reno, USA, 14.-18. Nov. 2016
Non Patent Literature 21: "Discussion on support of CA operation for NR", LG Electronics, R1-1611848, 3GPP TSG-RAN WG1 Meeting #87, Reno, USA, 14.-18. Nov. 2016

However, while transmission power is controlled in wireless communication systems, such as LTE, in accordance with LTE communication carriers, uplink transmission power is not controlled in accordance with new radio (NR) next generation communication carriers; therefore, there is a demand to control the transmission power.

SUMMARY

According to one embodiment, the terminal device includes a processor circuitry and a receiver. The processor circuitry is configured to perform dual connectivity with a cell group and a different cell group. The processor circuitry is configured to control transmission power sharing between the cell group and the different cell group. The processor is configured to, when transmissions of the cell group overlap in time with transmissions of the different cell group and a total amount of the transmission power amount of the cell group and the transmission power amount of the different cell group during the overlapping time is larger than a configured maximum transmission power amount, reduce a transmission power amount of the cell group or a transmission power amount of the different cell group during the overlapping time such that the total amount of the transmission power amount of the cell group and the transmission power amount of the different cell group is less than or equal to the configured maximum transmission power amount. The receiver is configured to receive a signal on the cell group and the different cell group.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of a terminal device, a base station device, a wireless communication system, and a wireless communication method disclosed in the present application will be described in detail below based on the drawings. The disclosed technology is not limited by the embodiments below. In addition, the embodiments described below may be combined appropriately as long as no contradiction is derived.

First Embodiment

Figure 1:
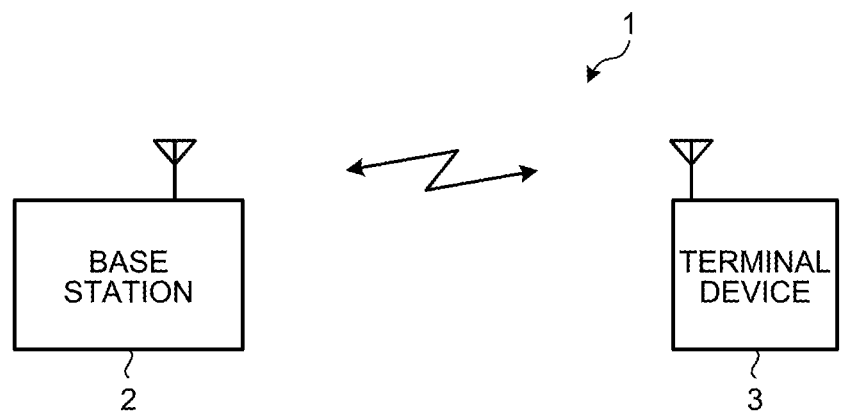
FIG. 1 is an explanatory diagram illustrating an example of a wireless communication system of a first embodiment.

FIG. 1 is an explanatory diagram illustrating an example of a wireless communication system 1 of a first embodiment. The wireless communication system 1 illustrated in FIG. 1 includes a base station 2 and a terminal device 3. The base station 2 transmits and receives data, such as eMBB data and URLLC data, to and from the terminal device 3 by a wireless carrier, for example. The base station 2 is, for example, a gNB of an NR cell or the like. The terminal device 3 transmits and receives data, such as eMBB data and URLLC data, to and from the base station 2 by a wireless carrier, for example.

Figure 2:
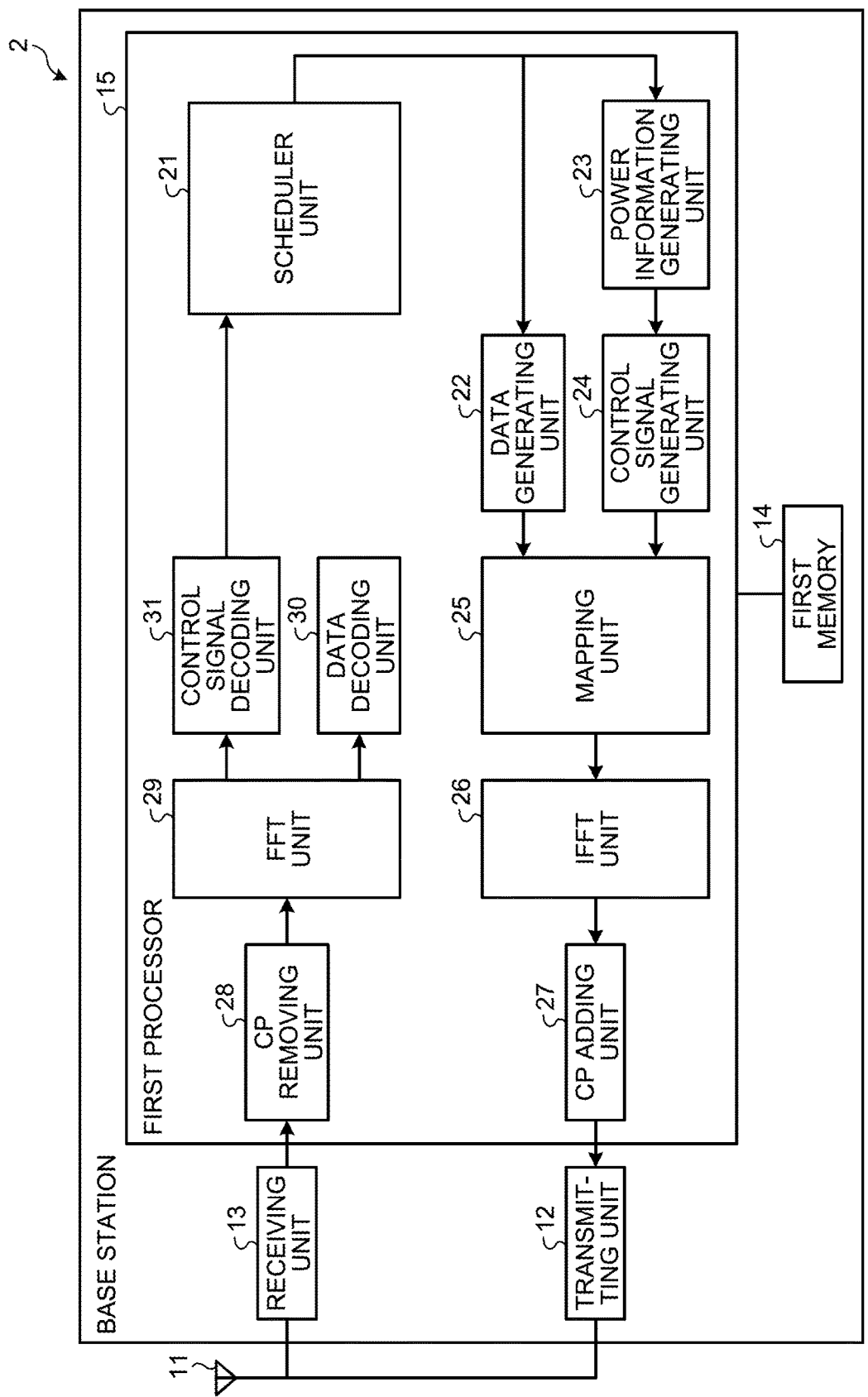
FIG. 2 is a block diagram illustrating an example of a base station of the first embodiment.

FIG. 2 is a block diagram illustrating an example of the base station 2 of the first embodiment. The base station 2 illustrated in FIG. 2 includes an antenna 11, a transmitting unit 12, a receiving unit 13, a first memory 14, and a first processor 15. The antenna 11 transmits and receives wireless signals of wireless carriers, for example. The transmitting unit 12 is a wireless interface that transmits wireless signals via the antenna 11. The receiving unit 13 is a wireless interface that receives wireless signals via the antenna 11. The first memory 14 includes, for example, a random access memory (RAM), a read only memory (ROM), or the like, and is an area for storing various kinds of information related to the base station 2. The first processor 15 includes, for example, a central processing unit (CPU), a field programmable gate array (FPGA), a digital signal processor (DSP), or the like, and controls the entire base station 2. Specifically, the first processor 15 includes a scheduler unit 21, a data generating unit 22, a power information generating unit 23, and a control signal generating unit 24. The first processor 15 further includes a mapping unit 25, an inverse fast Fourier transform (IFFT) unit 26, and a cyclic prefix (CP) adding unit 27. The first processor 15 still further includes a CP removing unit 28, a fast Fourier transform (FFT) unit 29, a data decoding unit 30, and a control signal decoding unit 31.

The scheduler unit 21 performs scheduling for assigning a wireless resource to data, such as eMBB data and URLLC data, which is transmitted and received to and from the plurality of terminal devices 3. Specifically, the scheduler unit 21 performs scheduling for uplink that is from the terminal device 3 to the base station 2, by assigning a wireless resource to data, such as eMBB data and URLLC data, which is transmitted by each of the terminal devices 3. The scheduler unit 21 also performs scheduling for downlink that is from the base station 2 to the terminal device 3, by assigning a wireless resource to data, such as eMBB data and URLLC data, which is transmitted to each of the terminal devices 3.

The data generating unit 22 generates data, such as eMBB data and URLLC data, which is to be transmitted to the terminal device 3, on the basis of information on the scheduling for downlink performed by the scheduler unit 21. In other words, the data generating unit 22 encodes and modulates data, such as eMBB data and URLLC data, which is to be transmitted to the terminal device 3. The power information generating unit 23 generates transmission power information for uplink and downlink. The control signal generating unit 24 generates a control signal for eMBB, URLLC, and the like, on the basis of the information on the scheduling performed by the scheduler unit 21, for example. Specifically when a wireless resource is assigned to URLLC data for unlink, the control signal generating unit 24 generates an URLLC control signal for designating a coding rate, a modulation method, transmission power, and the like of the URLLC data. The URLLC control signal is transmitted to the terminal device 3 that transmits the URLLC data. Further, the control signal generating unit 24 generates an eMBB control signal for designating a coding rate, a modulation method, transmission power, and the like of eMBB data, with respect to the terminal device 3 that transmits the eMBB data. The control signal generating unit 24 also generates a control signal for indicating a coding rate, a modulation method, transmission power, and the like of data, such as eMBB data and URLLC data, which is to be transmitted to each of the terminal devices 3.

The mapping unit 25 generates a transmission signal by mapping the eMBB data, the URLLC data, and the control signal, for example. The mapping unit 25 allocates the eMBB data, the URLLC data, and the control signal to wireless resources based on the scheduling information, for example. The mapping unit 25 divides each of slots constituting the transmission signal into a plurality of mini slots, and performs mapping in units of the mini slots, for example. As a result, when wireless resources are assigned to the URLLC data for uplink, the mapping unit 25 maps the URLLC control signal to a mini slot.

The IFFT unit 26 performs the inverse fast Fourier transform on the transmission signal generated by the mapping unit 25, and converts the transmission signal in the frequency domain to the transmission signal in the time domain. Then, the IFFT unit 26 outputs the transmission signal to the CP adding unit 27. The CP adding unit 27 adds a CP to the transmission signal output from the IFFT unit 26, in units of symbols. Then, the CP adding unit 27 outputs the transmission signal to which the CP is added to the transmitting unit 12.

The CP removing unit 28 removes the CP that is added in units of symbols to the signal received from the receiving unit 13. Then, the CP removing unit 28 outputs the received signal from which the CP is removed to the FFT unit 29. The FFT unit 29 performs the fast Fourier transform on the received signal output from the CP removing unit 28, and converts the received signal in the time domain to the received signal in the frequency domain. The received signal contains eMBB data and URLLC data transmitted from each of the terminal devices 3.

The data decoding unit 30 demodulates and decodes data, such as eMBB data and URLLC data, contained in the received signal. When the received signal contains URLLC data, the data decoding unit 30 decodes the entire eMBB data by assuming that the eMBB data to be received by a next slot is present at the position of the URLLC data, for example.

The control signal decoding unit 31, when detecting a request for the URLLC data from the terminal device 3, instructs the scheduler unit 21 to assign a wireless resource to the URLLC data for uplink. The transmitting unit 12 performs a wireless transmission process, such as digital-to-analog (D/A) conversion and up-conversion, on the transmission signal output from the CP adding unit 27, for example. Further, the transmitting unit 12 transmits the transmission signal via the antenna 11. The receiving unit 13 receives a wireless signal via the antenna 11, and performs a wireless reception process, such as down-conversion and analog-to-digital (A/D) conversion, on the received signal, for example. Then, the receiving unit 13 outputs the received signal to the CP removing unit 28.

Figure 3:
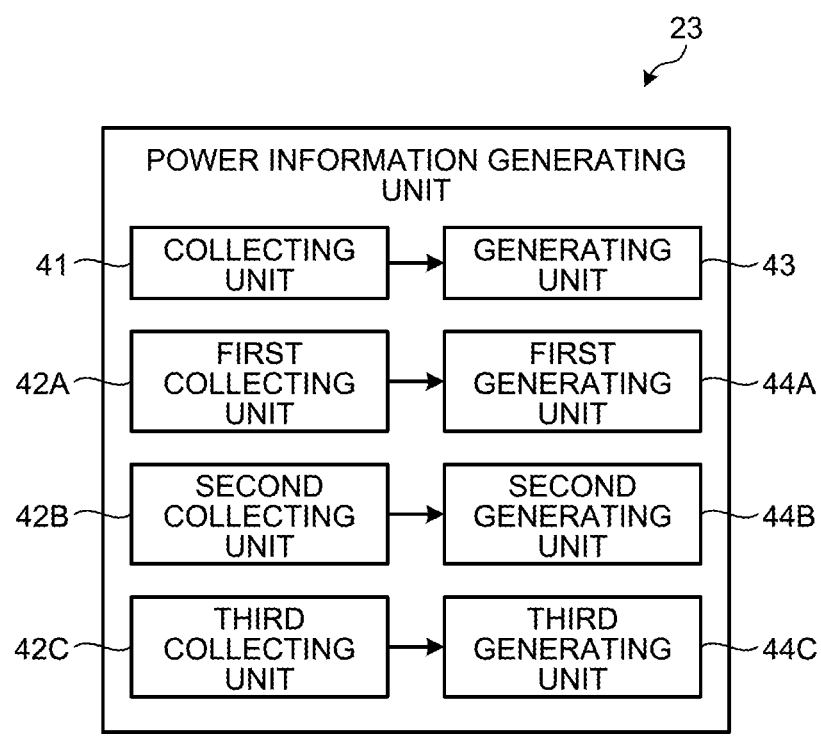
FIG. 3 is a block diagram illustrating an example of a power information generating unit of the first embodiment.

FIG. 3 is a block diagram illustrating an example of the power information generating unit 23 of the first embodiment. The power information generating unit 23 illustrated in FIG. 3 includes a collecting unit 41, a first collecting unit 42A, a second collecting unit 42B, a third collecting unit 42C, a generating unit 43, a first generating unit 44A, a second generating unit 44B, and a third generating unit 44C.

(Expression 1) is a formula for calculating a transmission power amount $P_{PUSCH}$ for uplink on the terminal device 3 side with a subframe i of a cell c, for example. "$P_{CMAX}$" is an allowable maximum transmission power amount available to the terminal device 3 for the uplink, "$M_{PUSCH}$" is the number of resource blocks, and "$P_{o\_PUSCH}$" is a target received power amount. "$\alpha$" is a path loss compensation factor, "PL" is a path loss measurement value between the cell and the terminal device 3, "$\Delta_{TF}$" is a power offset value induced by MCS, "f" is a correction amount corresponding to a fading amount, such as "short fading" in uplink.

$$P_{PUSCH,c}(i) = \min \left\{ \begin{array}{l} P_{CMAX,c}(i), \\ 10 \log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

The terminal device 3 calculates a transmission power amount of uplink toward the base station 2 on the basis of (Expression 1). However, when the base station 2 is a base station of an NR cell, the terminal device 3 is not able to accurately calculate the transmission power amount of the uplink toward the base station 2 while reflecting a carrier of the NR cell. Therefore, the terminal device 3 calculates the transmission power amount of the uplink toward the base station 2 that is the NR cell, on the basis of (Expression 2). As a result, even when the base station 2 is the NR cell, the terminal device 3 is able to calculate the transmission power amount of the uplink while reflecting the carrier of the NR cell with high accuracy.

$$P_{PUSCH,c}(i) = \min \left\{ \begin{array}{l} P_{CMAX,c}(i) - \Sigma_{B,c}(i), \\ 10 \log_{10}(M_{PUSCH,c}(i)) + \beta_{SCS}(j) + P_{O\_PUSCH,c}(j) + \\ \alpha_c(j) \cdot PL_c + \Delta_{TF,c}(i) + f_c(i) \end{array} \right\}$$

"$\Sigma_B$" is a first correction amount for correcting "$P_{CMAX}$" in (Expression 1) depending on a signal waveform of the carrier of the NR cell, for example. The signal waveform of the carrier of the NR cell has a different peak to average power ratio (PAPR), such as CP-orthogonal frequency division multiplexing (OFDM) or discrete Fourier transform (DFT)-spread (S)-OFDM. The first correction amount is a correction amount for avoiding signal distortion of an output amplifier, which occurs depending on a carrier type of the NR cell, for example.

"$\beta_{SCS}$" is a second correction amount for correcting the calculated power amount Pc depending on a transmission time interval (TTI) of the carrier of the NR cell, for example. A wireless parameter (numerology) of the carrier of the NR cell has a different TTI, for example. The second correction amount is a correction amount for compensating for a power density change that changes when the TTI is different in a different NR carrier. Further, "f" is a third correction amount for correcting the calculated power amount Pc depending on the fading amount in uplink. Meanwhile, as indicated by (Expression 3), the calculated power amount Pc is calculated by parameters that are set when wireless communication is established between the base station 2 and the terminal device 3. The parameters are, for example, "$M_{PUSCH}$", "$P_{o\_PUSCH}$", "$\alpha$", "PL", and "$\Delta_{TF}$", which are parameters that do not largely change after the wireless communication is established.

$$Pc = 10 \log_{10}(M_{PUSCH,c}(i)) + P_{O\_PUSCH,c}(j) + \alpha_c(j) \cdot PL_c + \Delta_{TF,c}(i)$$

The collecting unit 41 collects the parameters, such as "$M_{PUSCH}$", "$P_{o\_PUSCH}$", "$\alpha$", "PL", and "$\Delta_{TF}$" used in (Expression 2) The first collecting unit 42A collects various parameters related to the first correction amount "$\Sigma_B$". The second collecting unit 42B collects various parameters related to the second correction amount "$\beta_{SCS}$". The third collecting unit 42C collects various parameters related to the third correction amount "f". The generating unit 43 generates the parameters collected by the collecting unit 41. The first generating unit 44A generates the first correction amount "$\Sigma_B$" with the various parameters collected by the first collecting unit 42A. The second generating unit 44B generates the second correction amount "$\beta_{SCS}$" with the various parameters collected by the second collecting unit 42B. The third generating unit 44C generates the third correction amount "f" with the various parameters collected by the third collecting unit 42C.

The control signal generating unit 24 generates a control signal that contains radio resource control (RRC) signaling information that contains the parameters generated by the generating unit 43. Meanwhile, the base station 2 notifies the terminal device 3 of the RRC signaling information containing the parameters when the wireless communication is established between the terminal device 3 and the base station 2. Further, the control signal generating unit 24 generates a control signal for a transmission power control (TPC) command of L1 signaling information that contains the first correction amount, the second correction amount, and the third correction amount. Meanwhile, the base station 2 notifies the terminal device 3 of the TPC command of the L1 signaling information containing the first correction amount, the second correction amount, and the third correction amount at a predetermined timing.

Figure 4:
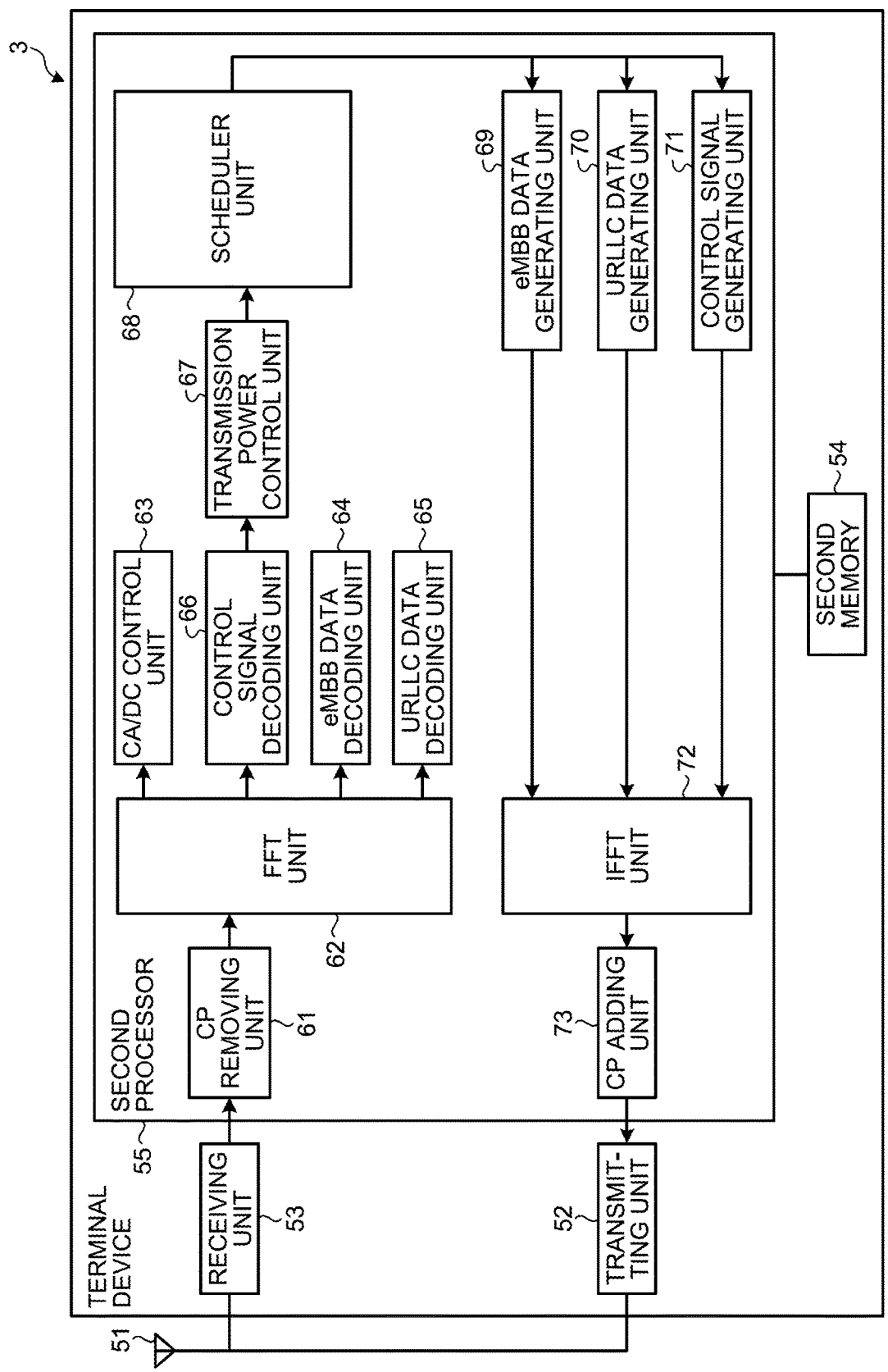
FIG. 4 is a block diagram illustrating an example of a terminal device of the first embodiment.

FIG. 4 is a block diagram illustrating an example of the terminal device 3 of the first embodiment. The terminal device 3 illustrated in FIG. 4 includes an antenna 51, a transmitting unit 52, a receiving unit 53, a second memory 54, and a second processor 55. The antenna 51 transmits and receives wireless signals to and from the terminal device 3, for example. The transmitting unit 52 is a wireless interface that transmits wireless signals via the antenna 51. The receiving unit 53 is a wireless interface that receives wireless signals via the antenna 51. The second memory 54 includes, for example, a random access memory (RAM), a read only memory (ROM), or the like, and is an area for storing various kinds of information related to the terminal device 3. The second processor 55 includes, for example, a central processing unit (CPU), a field programmable gate array (FPGA), a digital signal processor (DSP), or the like, and controls the entire terminal device 3.

The receiving unit 53 receives a wireless signal via the antenna 51, performs a wireless reception process, such as down-conversion and A/D conversion, on the received signal, for example. Then, the receiving unit 53 outputs the received signal to the second processor 55. The transmitting unit 52 performs a wireless transmission process, such as D/A conversion and up-conversion, on a transmission signal output from the second processor 55, for example. Then, the transmitting unit 52 transmits the transmission signal via the antenna 51.

The second processor 55 includes a CP removing unit 61, an FFT unit 62, a carrier aggregation (CA)/dual connectivity (DC) control unit 63, an eMBB data decoding unit 64, and an URLLC data decoding unit 65. The second processor 55 further includes a control signal decoding unit 66, a transmission power control unit 67, a scheduler unit 68, an eMBB data generating unit 69, an URLLC data generating unit 70, a control signal generating unit 71, an IFFT unit 72, and a CP adding unit 73.

The CP removing unit 61 removes a CP that is added in units of symbols to the received signal. Then, the CP removing unit 61 outputs the received signal from which the CP is removed to the FFT unit 62. The FFT unit 62 performs the fast Fourier transform on the received signal output from the CP removing unit 61, and converts the received signal in the time domain to the received signal in the frequency domain. The received signal contains eMBB data, URLLC data, and the control signal transmitted from the base station 2, for example.

The eMBB data decoding unit 64 demodulates and decodes data, such as eMBB data, from the received signal in the frequency domain subjected to the conversion by the FFT unit 62. The URLLC data decoding unit 65 demodulates and decodes data, such as URLLC data, from the received signal in the frequency domain subjected to the conversion by the FFT unit 62. The control signal decoding unit 66 demodulates and decodes the control signal contained in the received signal.

The eMBB data generating unit 69 generates eMBB data to be transmitted to the base station 2, and performs encoding and modulation on the generated eMBB data. Further, the eMBB data generating unit 69 generates data to be transmitted to the base station 2, and performs encoding and modulation on the generated data. Then, the eMBB data generating unit 69 outputs the modulated eMBB data to the IFFT unit 72. The IFFT unit 72 performs the inverse fast Fourier transform on the eMBB data output from the eMBB data generating unit 69, and converts the transmission signal in the frequency domain to the transmission signal in the time domain. Then, the IFFT unit 72 outputs the transmission signal in the time domain to the CP adding unit 73. The CP adding unit 73 adds a CP in units of symbols to the transmission signal output from the IFFT unit 72. Then, the CP adding unit 73 outputs the transmission signal to which the CP is added to the transmitting unit 52.

The CA/DC control unit 63 controls CA based on the control signal, and outputs a CA control result to the scheduler unit 68. Further, the CA/DC control unit 63 controls DC based on the control signal, and outputs a DC control result to the scheduler unit 68.

The transmission power control unit 67 calculates a transmission power amount of uplink toward the base station 2, on the basis of the parameters that are contained in the RRC signaling information, the first correction amount, the second correction amount, and the third correction amount that are contained in the TCP command of the L1 signaling information, and the predetermined function of (Expression 2), which are contained in control signals. Then, the transmission power control unit 67 controls transmission power of the uplink toward the base station 2 while reflecting the NR carrier, on the basis of the calculated transmission power amount.

Figure 5:
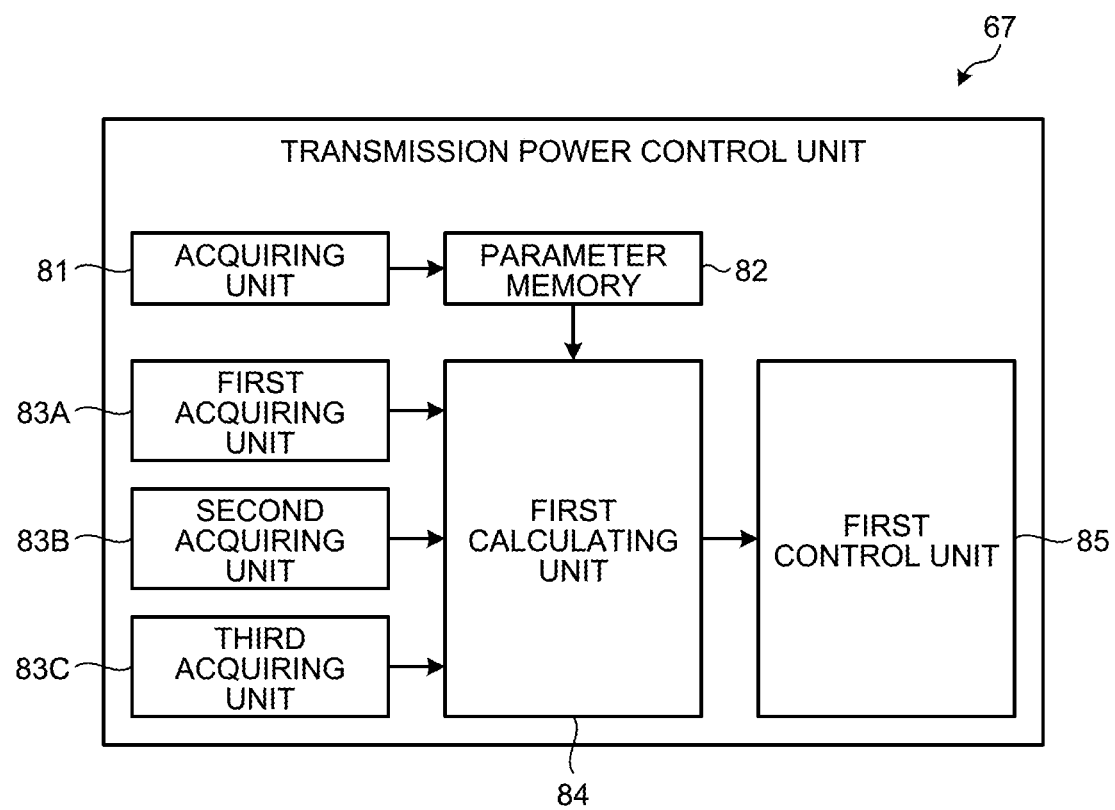
FIG. 5 is a block diagram illustrating an example of a transmission power control unit of the first embodiment.

FIG. 5 is a block diagram illustrating an example of the transmission power control unit 67 of the first embodiment. The transmission power control unit 67 illustrated in FIG. 5 includes an acquiring unit 81, a parameter memory 82, a first acquiring unit 83A, a second acquiring unit 83B, a third acquiring unit 83C, a first calculating unit 84, and a first control unit 85. The acquiring unit 81 acquires the parameters contained in the RRC signaling information and stores the acquired parameters in the parameter memory 82.

The first acquiring unit 83A acquires the first correction amount contained in the TPC command. The second acquiring unit 83B acquires the second correction amount contained in the TPC command. The third acquiring unit 83C acquires the third correction amount contained in the TPC command. The first calculating unit 84 assigns the parameters stored in the parameter memory 82, the first correction amount, the second correction amount, and the third correction amount to (Expression 4).

$$P_{PUSCH,c}(i) = \min\begin{Bmatrix} P_{CMAX,c}(i) - \Sigma_{B,c}(i), \\ Pc + f_c(i) + \beta_{SCS}(j) \end{Bmatrix}$$

The first calculating unit 84 calculates the transmission power amount of the uplink toward the base station 2, on the basis of (Expression 4). In other words, the first calculating unit 84 calculates the calculated power amount Pc, and corrects the calculated power amount Pc using the second correction amount and the third correction amount. Further, the first calculating unit 84 corrects the allowable maximum transmission power amount by the first correction amount. Then, the first calculating unit 84 calculates, as the transmission power amount of the uplink, a smaller one of the allowable maximum transmission power amount that is corrected by the first correction amount and the calculated power amount Pc that is corrected by the second correction amount and the third correction amount. Then, the first calculating unit 84 sets the calculated transmission power amount in the first control unit 85. The first control unit 85 controls the transmission power of the uplink toward the base station 2, on the basis of the calculated transmission power amount.

The terminal device 3 of the first embodiment, as indicated by (Expression 4), corrects the allowable maximum transmission power amount "$P_{CMAX}$" by the first correction amount "$\Sigma_B$" that changes depending on the signal waveform of the NR carrier, and corrects the calculated power amount Pc by the second correction amount "$\beta_{SCS}$" that changes depending on the TTI of the NR carrier. Further, the terminal device 3 corrects the calculated power amount Pc by the third correction amount "f" that changes depending on the fading amount. The terminal device 3 calculates the transmission power amount of the uplink toward the base station 2 on the basis of (Expression 4). As a result, it is possible to calculate the transmission power amount of the uplink toward the base station 2 while reflecting the NR carrier.

In the wireless communication system 1 of the first embodiment as described above, the base station 2 collects the parameters, the first correction amount, the second correction amount, and the third correction amount, and notifies the terminal device 3 of the parameters, the first correction amount, the second correction amount, and the third correction amount collected as above. Then, the terminal device 3 calculates the transmission power amount of uplink toward the base station 2 on the basis of the parameters, the first correction amount, the second correction amount, the third correction amount, and the predetermined function. However, various modifications may be made appropriately; for example, the base station 2 may calculate the transmission power amount of uplink for the terminal device 3 on the basis of the parameters, the first correction amount, the second correction amount, and the third correction amount collected as above, and notify the terminal device 3 of the transmission power amount.

NR handles various kinds of wireless parameters (Numerology), multi-beam (multi-panel), signal waveforms, multi-service/traffic such as eMBB or URLLC, and multi-access schemes such as non-orthogonal multiple access (NOMA). Therefore, the terminal device 3 calculates the transmission power amount of the uplink using the first correction amount, the second correction amount, and the third correction amount. However, the correction amounts are not limited to those described above, and various modifications may be made appropriately.

NR needs to take into account a signal to interference noise ratio (SINR). In this case, correction amounts for correcting a target received power parameter "$P_{o\_PUSCH}$" and the path loss compensation factor "$\alpha$" in (Expression 2) in accordance with the SINR are needed. Further, in some cases NR needs to take into account beams, signal waveforms, and service types. In this case, correction amounts for correcting "$P_{CMAX}-\Sigma_B$" and "$\beta_{SCS}+\Delta_{TF}$" in (Expression 2) in accordance with the service types or the capability of the terminal device 3 are needed. Therefore, the terminal device 3 is able to calculate the transmission power amount of the uplink while reflecting the NR carrier by using the correction amounts as described above.

Even when a new carrier is introduced, the terminal device 3 of the first embodiment is able to smoothly set the transmission power amount of the uplink toward the base station 2 for the new carrier. While the example has been described in which the single carrier is used, the terminal device 3 of the first embodiment is able to cope with a case in which carrier aggregation (CA) is performed to perform simultaneous communication using two carriers, for example. This mode will be described below as a second embodiment. In the CA, different Numerology (subcarrier interval and TTI) is set for each of carriers.

Second Embodiment

Figure 6:
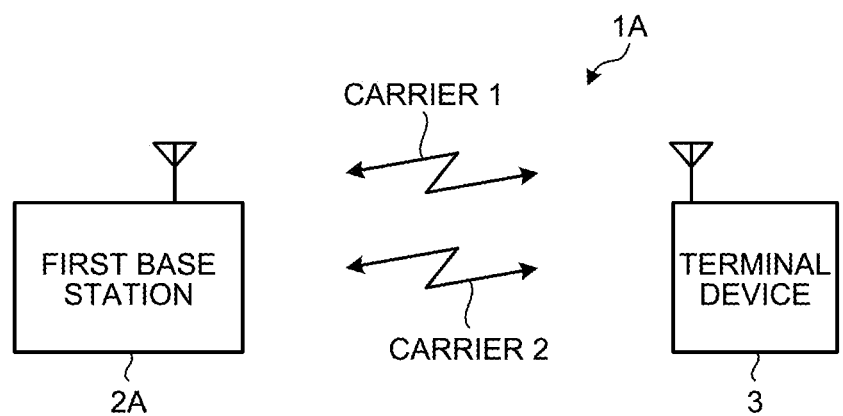
FIG. 6 is an explanatory diagram illustrating an example of a wireless communication system of a second embodiment.

FIG. 6 is an explanatory diagram illustrating an example of a wireless communication system 1A of the second embodiment. The same components as those of the wireless communication system 1 of the first embodiment are denoted by the same reference signs, and explanation of the same configurations and operation will be omitted. The wireless communication system 1A illustrated in FIG. 6 includes a first base station 2A and the terminal device 3. The first base station 2A has the same configuration as the base station 2 illustrated in FIG. 2, for example. The terminal device 3 performs simultaneous communication with the first base station 2A using two carriers.

Figure 7:
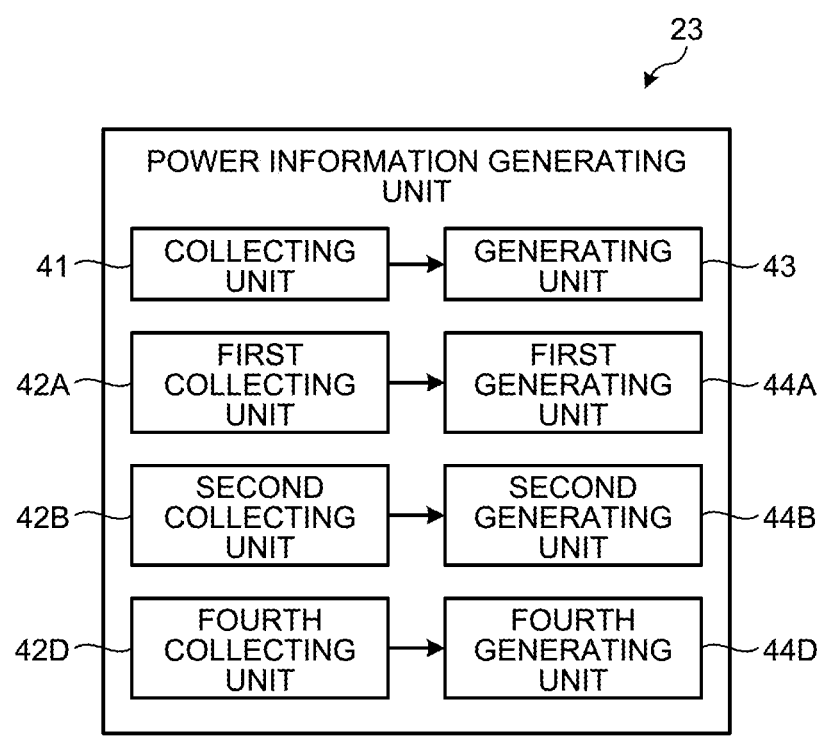
FIG. 7 is a block diagram illustrating an example of a power information generating unit of the second embodiment.

FIG. 7 is a block diagram illustrating an example of the power information generating unit 23 of the second embodiment. The power information generating unit 23 illustrated in FIG. 7 includes a fourth collecting unit 42D instead of the third collecting unit 42C, and includes a fourth generating unit 44D instead of the third generating unit 44C. The fourth collecting unit 42D collects parameters related to a third correction amount $f_{c1}$ for a carrier 1 and a third correction amount $f_{c2}$ for a carrier 2. The fourth collecting unit 42D generates a fourth correction amount, which is $f_{c1}-f_{c2}=\Delta f$, on the basis of a collection result. The control signal generating unit 24 notifies the terminal device 3 of the fourth correction amount by a TPC command of L1 signaling. The terminal device 3 receives only $f_{c1}-f_{c2}=\Delta f$, which is the fourth correction amount, by the TCP command. As a result, it is possible to reduce the overhead of L1 signaling from the first base station 2A to the terminal device 3. For example, because the first base station 2A does not calculate the transmission power amount for each of the carriers and notify the terminal device 3 of the calculated amounts, but the first base station 2A notifies the terminal device 3 of only $f_{c1}-f_{c2}=\Delta f$, which is the fourth correction amount, by the TCP command, it is possible to reduce the overhead of L1 signaling.

Figure 8:
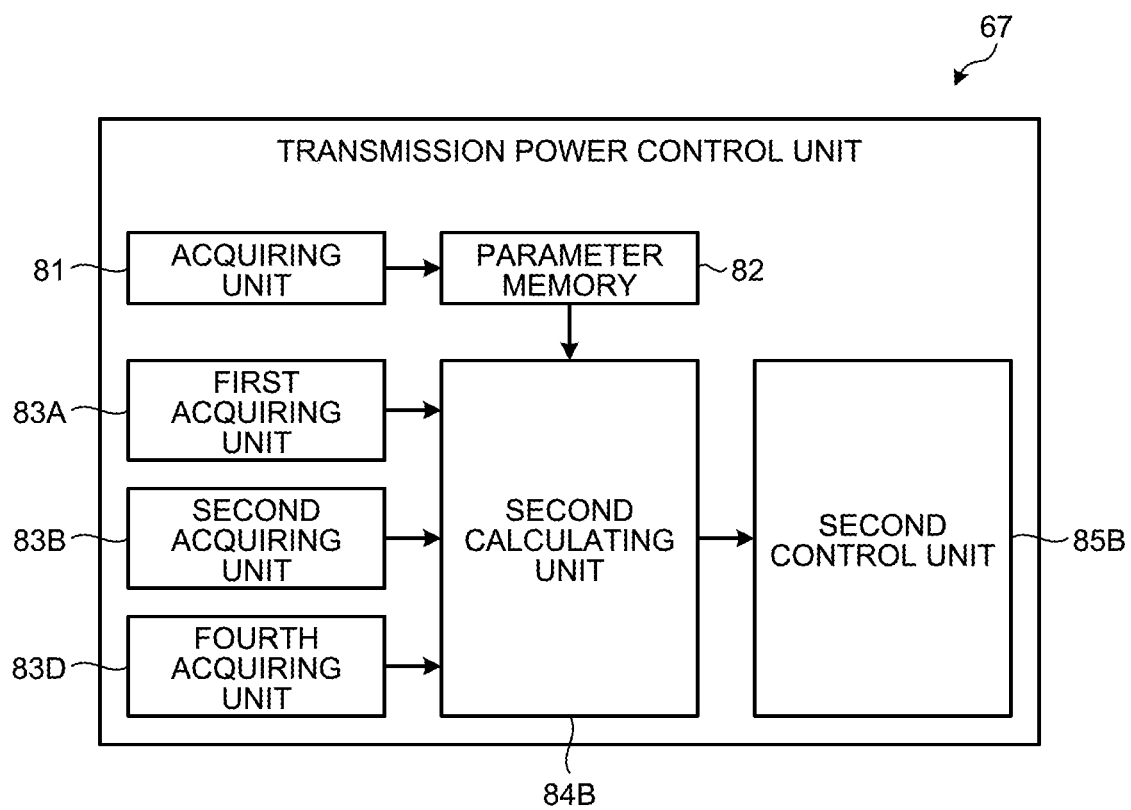
FIG. 8 is a block diagram illustrating an example of a transmission power control unit of the second embodiment.

FIG. 8 is an explanatory diagram illustrating an example of the transmission power control unit 67 of the second embodiment. The transmission power control unit 67 illustrated in FIG. 8 includes a fourth acquiring unit 83D instead of the third acquiring unit 83C, includes a second calculating unit 84B instead of the first calculating unit 84, and includes a second control unit 85B instead of the first control unit 85.

The fourth acquiring unit 83D acquires the fourth correction amount contained in the TPC command. The second calculating unit 84B assigns the parameters, the first correction amount, the second correction amount, and the fourth correction amount to formulas represented by (Expression 5) and (Expression 3).

$$P_{PUSCH,c}(i) = \min\left\{\begin{array}{l} P_{CMAX,c}(i) - \Sigma_{B,c}(i), \\ P_1 + P_2 + \beta_{SCS}(j) \end{array}\right\}$$

"$P_1$" in (Expression 5) is, as indicated by (Expression 6), a sum of the calculated power amount Pc of the first base station 2A and the third correction amount corresponding to the carrier 1. "$P_2$" in (Expression 5) is, as indicated by (Expression 7), a sum of the calculated power amount Pc of a second base station 2B and the third correction amount corresponding to the carrier 2. The fourth correction amount "$\Delta f$" is represented by (Expression 8), and a total transmission power amount "$P_{CM}$" of the carrier 1 and the carrier 2 is represented by (Expression 9).

$P_1 = Pc + f_{c1}(i)$ $P_2 = Pc + f_{c2}(i)$ $f_{c1}(i) - f_{c2}(i) = \Delta f$ $10^{f_{c1}(i)} + 10^{f_{c2}(i)} = P_{CM} = P_1 + P_2$ The second calculating unit 84B calculates the transmission power amount of uplink for the carrier 1 and the carrier 2 on the basis of (Expression 5), and sets the calculated transmission power amount in the second control unit 85B. The second control unit 85B controls the transmission power of the uplink for the carrier 1 and the carrier 2 on the basis of the calculated transmission power amount.

As indicated by (Expression 5), the terminal device 3 corrects the allowable maximum transmission power amount "$P_{CMAX}$" by the first correction amount "$\Sigma_B$" that changes depending on the signal waveform of the NR carrier, and corrects the calculated power amount Pc by the second correction amount "$\beta_{SCS}$" that changes depending on the TTI of the NR carrier. Further, the terminal device 3 corrects the calculated power amount Pc by the fourth correction amount that is $f_{c1} - f_{c2} = \Delta f$. The terminal device 3 calculates the transmission power amount of the uplink for the carrier 1 and the carrier 2 of the first base station 2A on the basis of (Expression 5). As a result, it is possible to calculate the transmission power amount of the uplink for the two carriers of the NR.

The terminal device 3, even when the two carriers are used, receives only the fourth correction amount, which is $f_{c1} - f_{c2} = \Delta f$, by L1 signaling from the first base station 2A; therefore, it is possible to reduce the header of the signaling between the first base station 2A and the terminal device 3. A conventional base station calculates the transmission power amount of each of the carriers by using (Expression 1) for each of the carriers, and notifies a terminal device of the transmission power amount of each of the carriers. In contrast, the first base station 2A of the present embodiment notifies the terminal device 3 of only the fourth correction amount that is $f_{c1} - f_{c2} = \Delta f$. Further, the terminal device 3 is able to calculate the transmission power amount by (Expression 5) using the fourth correction amount. In other words, two power control methods are not transmitted simultaneously, but only a single expression (Expression 5) applicable to both of the carriers is used. Therefore, the first base station 2A notifies the terminal device 3 of only the fourth correction amount, so that it is possible to reduce the signaling overhead.

While the example has been described in the second embodiment as described above in which the fourth correction amount is $f_{c1} - f_{c2} = \Delta f$, various modifications may be made. For example, it is possible to adopt $f_{c1}/f_{c2} = \Delta f$.

In the terminal device 3 of the second embodiment as described above, it is assumed that the first base station 2A is a base station of an NR cell. However, the technology is similarly applicable to a case in which the first base station 2A is a base station of an LTE cell. This mode will be described below as a third embodiment.

Third Embodiment

Figure 9:
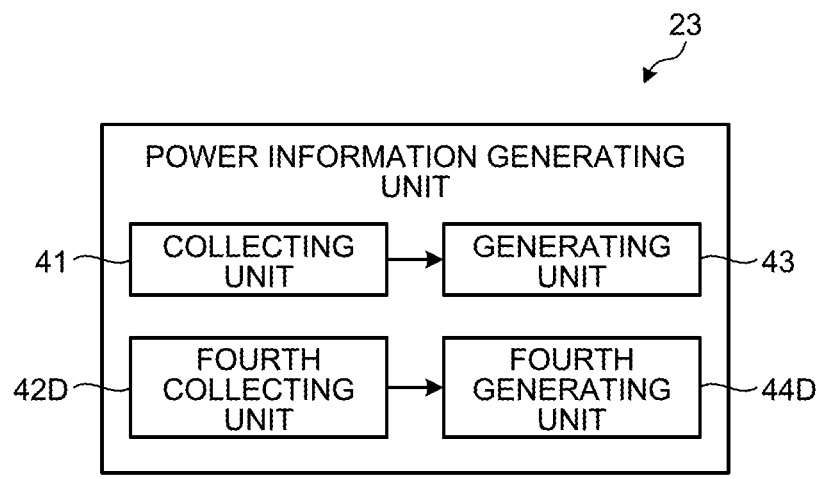
FIG. 9 is a block diagram illustrating an example of a power information generating unit of a third embodiment.

FIG. 9 is a block diagram illustrating an example of the power information generating unit 23 of the third embodiment. When the first base station 2A is a base station of an LTE cell, the first correction amount and the second correction amount are not needed. In the power information generating unit 23 illustrated in FIG. 9, the first collecting unit 42A, the second collecting unit 42B, the first generating unit 44A, and the second generating unit 44B are deleted because the first correction amount and the second correction amount are not needed. Further, the power information generating unit 23 causes the generating unit 43 to generate parameters, and causes the fourth generating unit 44D to generate the fourth correction amount.

Figure 10:
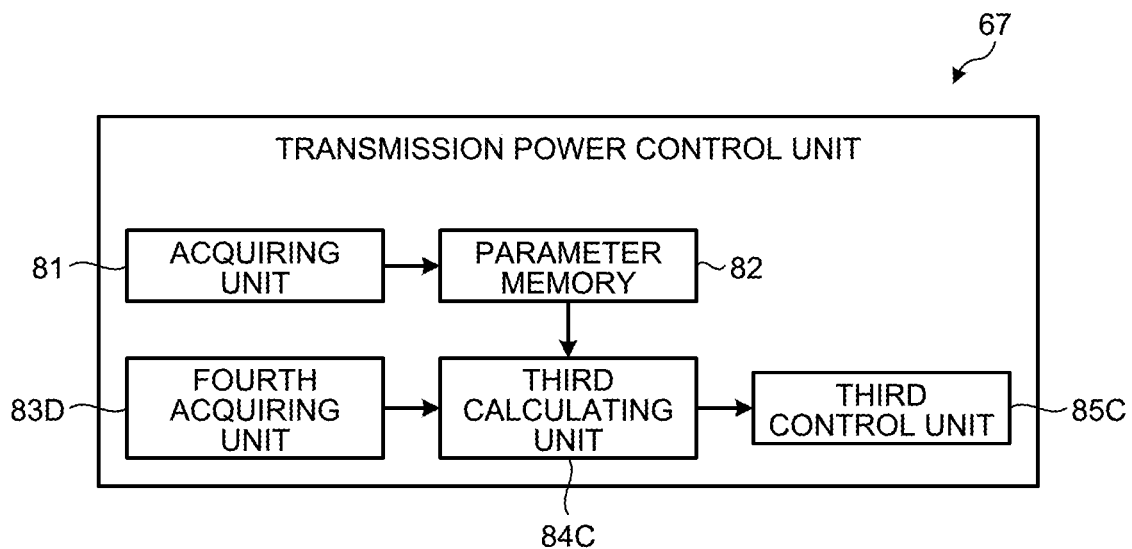
FIG. 10 is a block diagram illustrating an example of a transmission power control unit of the third embodiment.

FIG. 10 is a block diagram illustrating an example of the transmission power control unit 67 of the third embodiment. In the transmission power control unit 67 illustrated in FIG. 10, the first acquiring unit 83A and the second acquiring unit 83B are deleted because the first correction amount and the second correction amount are not needed. Further, the transmission power control unit 67 includes a third calculating unit 84C instead of the second calculating unit 84B, and includes a third control unit 85C instead of the second control unit 85B.

The third calculating unit 84C assigns the parameter stored in the parameter memory 82 and the fourth correction amount acquired by the fourth acquiring unit 83D to equations represented by (Expression 10), (Expression 6), (Expression 7), and (Expression 11).

$Pc = 10 \log_{10}(M_{PUSCH,c}(i)) + P_{O\_PUSCH,c}(j) + \alpha_c(j) \cdot PL_c + \Delta_{TF,c}(i)$ $$P_{PUSCH} = \min\left\{\begin{array}{l} P_{CMAX}, \\ P_1 + P_2 \end{array}\right\}$$

The third calculating unit 84C calculates the transmission power amount of uplink for the carrier 1 and the carrier 2 of the first base station 2A on the basis of (Expression 10) and (Expression 11), and sets the calculated transmission power amount in the third control unit 85C. The third control unit 85C controls the transmission power of the uplink for the carrier 1 and the carrier 2 of the first base station 2A on the basis of the calculated transmission power amount.

The terminal device 3 corrects, as indicated by (Expression 11), the calculated power amount Pc by the fourth correction amount that is $f_{c1}-f_{c2}=\Delta f$. The terminal device 3 calculates the transmission power amount of the uplink for the carrier 1 and the carrier 2 of the first base station 2A based on (Expression 6) to (Expression 9) and (Expression 11). As a result, even when the first base station 2A is a base station of an LTE cell, it is possible to calculate the transmission power amount of the uplink for the carrier 1 and the carrier 2 of the first base station 2A. In other words, only a single expression (Expression 11) that is applicable to both of the carriers is used instead of simultaneously transmitting two power control methods. Therefore, the first base station 2A notifies the terminal device 3 of only the fourth correction amount, so that it is possible to reduce the signaling overhead.

In the second embodiment as described above, the example has been described in which simultaneous communication is performed using the two carriers of the NR cell of the first base station 2A. Further, in the third embodiment as described above, the example has been described in which simultaneous communication is performed using the two carriers of the LTE cell of the first base station 2A. However, the embodiments are not limited to the two carriers, but various modifications may be made; for example, it may be possible to use three or more carriers.

Next, an embodiment in a case where the terminal device 3 performs dual connectivity (DC) for simultaneous communication in uplink of a master cell group (MCG) and a secondary cell group (SCG) will be described as a fourth embodiment. Dynamic power sharing is adopted in a synchronous LTE-NR DC scenario, in which HARQ timing and timing between UL assignment and corresponding UL data transmission are constant.

Fourth Embodiment

Figure 11:
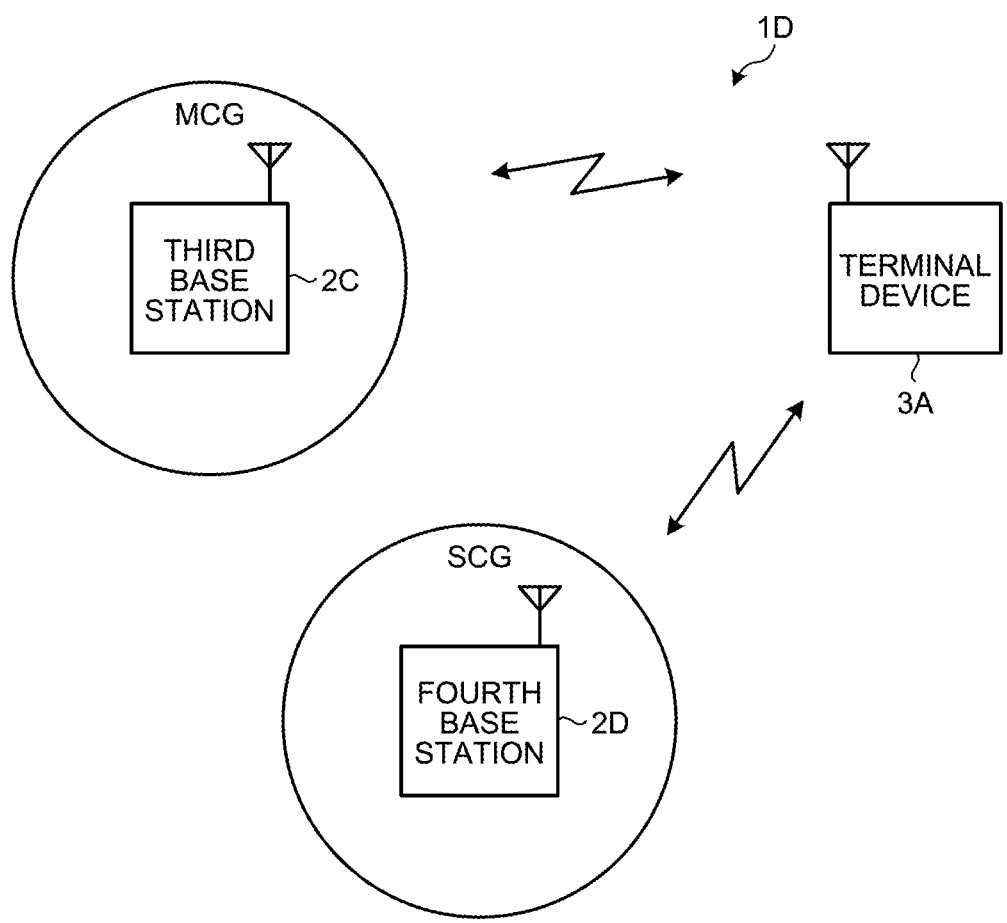
FIG. 11 is an explanatory diagram illustrating an example of a wireless communication system of a fourth embodiment.

FIG. 11 is an explanatory diagram illustrating an example of a wireless communication system 1D of the fourth embodiment. The same components as those of the wireless communication system 1 of the first embodiment are denoted by the same reference signs, and explanation of the same configuration and operation will be omitted. The wireless communication system 1D illustrated in FIG. 11 includes an MCG, an SCG, and a terminal device 3A. The MCG is, for example, an LTE cell group, and includes a third base station 2C. The SCG is, for example, an NR cell group, and includes a fourth base station 2D. Meanwhile, the third base station 2C and the fourth base station 2D have approximately the same configurations as the base station 2 illustrated in FIG. 2.

Figure 12:
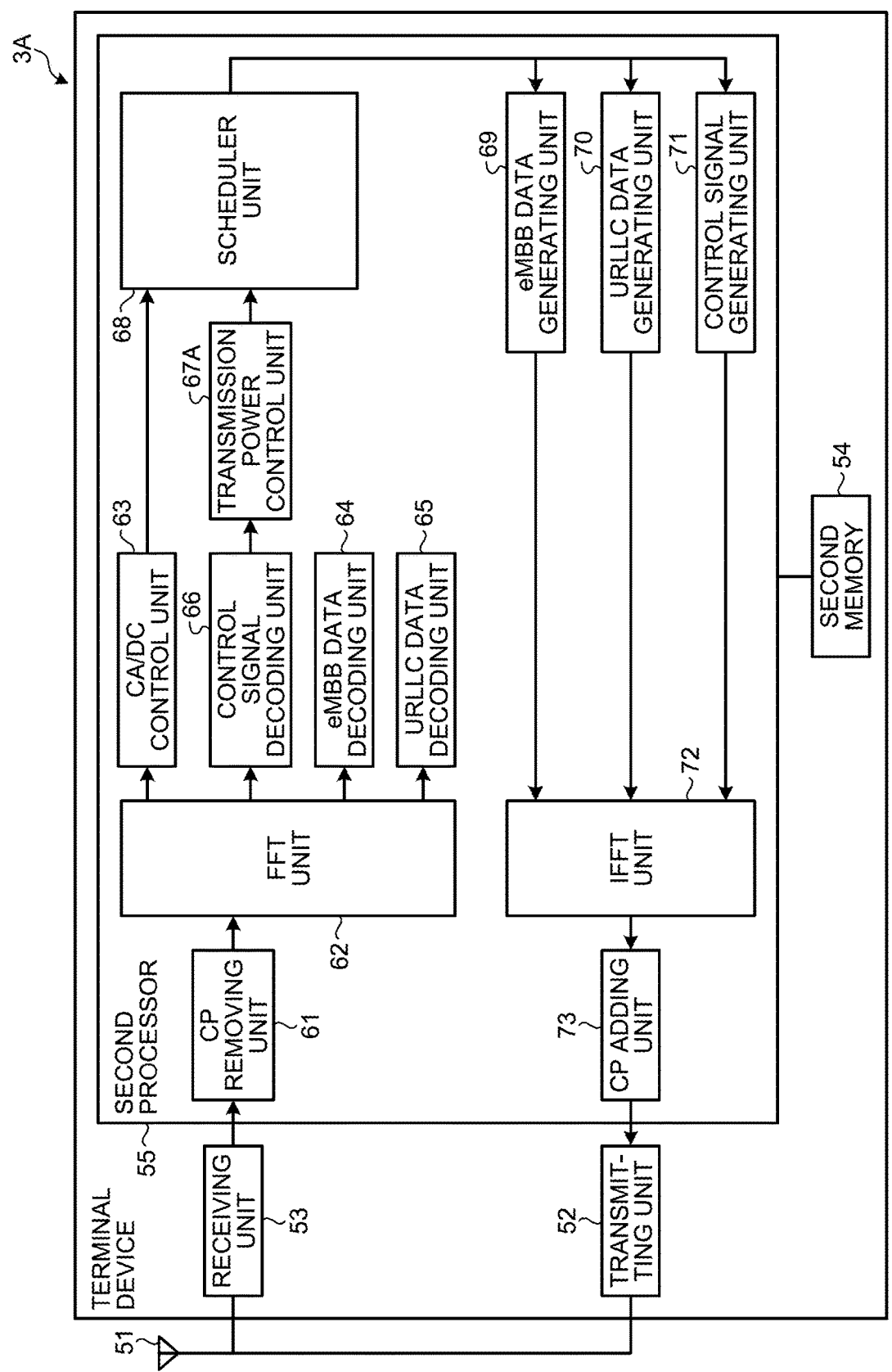
FIG. 12 is a block diagram illustrating an example of a terminal device of the fourth embodiment.
Figure 13:
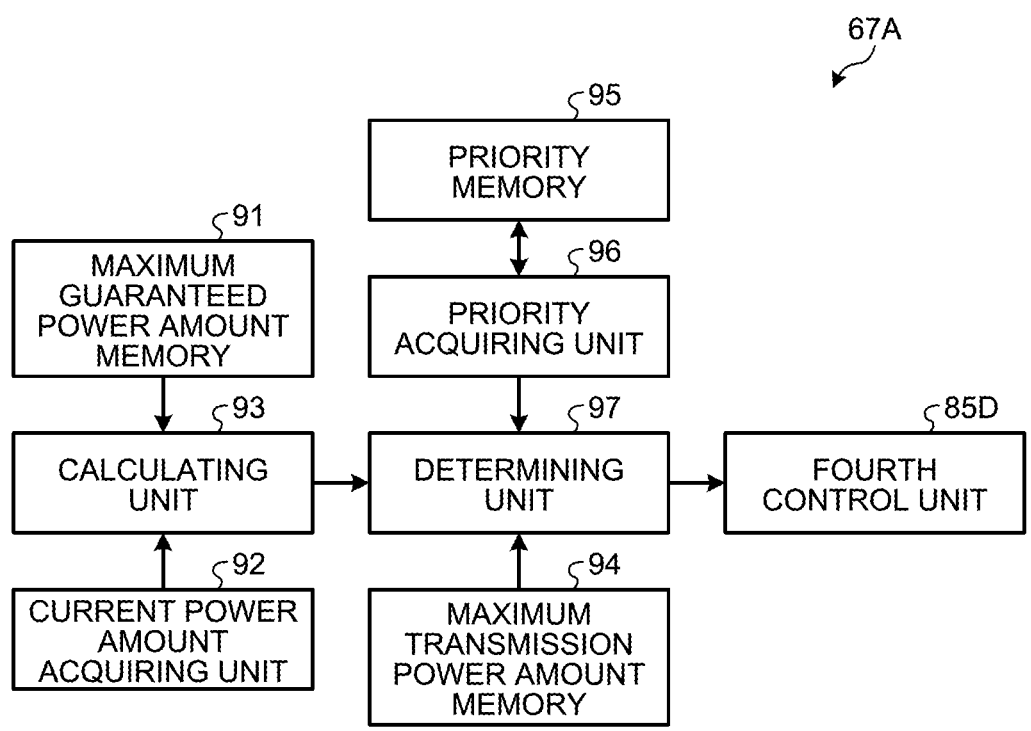
FIG. 13 is a block diagram illustrating an example of a transmission power control unit of the fourth embodiment.

FIG. 12 is a block diagram illustrating an example of the terminal device 3A of the fourth embodiment. The terminal device 3A illustrated in FIG. 12 includes a transmission power control unit 67A instead of the transmission power control unit 67. FIG. 13 is a block diagram illustrating an example of the transmission power control unit 67A of the fourth embodiment. The transmission power control unit 67A illustrated in FIG. 13 includes a maximum guaranteed power amount memory 91, a current power amount acquiring unit 92, a calculating unit 93, a maximum transmission power amount memory 94, a priority memory 95, a priority acquiring unit 96, a determining unit 97, and a fourth control unit 85D.

The maximum guaranteed power amount memory 91 stores therein a maximum guaranteed power amount (MGP) of the MCG, and a maximum guaranteed power amount of the SCG. The maximum guaranteed power amount of the MCG is a transmission power amount with which the terminal device 3A is guaranteed, by the third base station 2C, to use minimum transmission power of uplink toward the MCG. The maximum guaranteed power amount of the SCG is a transmission power amount with which the terminal device 3A is guaranteed, by the third base station 2C, to use minimum transmission power of uplink toward the SCG. Meanwhile, the base station 2 notifies the terminal device 3A of the maximum guaranteed power amounts as described above using RRC signaling with a cycle of 10 milliseconds, for example.

The current power amount acquiring unit 92 acquires a current power amount of the MCG and a current power amount of the SCG. The current power amount of the MCG is a transmission power amount that is used by the terminal device 3A for uplink wireless communication with the MCG. It is assumed that the terminal device 3A calculates the current power amount of the MCG by using, for example, (Expression 1). The current power amount of the SCG is a transmission power amount that is used by the terminal device 3A for uplink wireless communication with the SCG. It is assumed that the terminal device 3A calculates the current power amount of the SCG by using, for example, (Expression 2). The calculating unit 93 calculates an excess amount of the MCG by subtracting the current power amount of the MCG from the maximum guaranteed power amount of the MCG. The excess amount of the MCG is a transmission power amount that can be allocated to a different cell group, such as the SCG. The excess amount calculating unit 93 calculates an excess amount of the SCG by subtracting the current power amount of the SCG from the maximum guaranteed power amount of the SCG. The excess amount of the SCG is a transmission power amount that can be allocated to a different cell group, such as the MCG.

The priority memory 95 is an area for storing a priority for each data type. A priority of the URLLC data is set to be higher than a priority of the eMBB data. The priority acquiring unit 96 acquires a priority of corresponding data from the priority memory 95 depending on a data type of data that is used in each of uplink slots of the SCG. The priority acquiring unit 96 acquires a priority of corresponding data from the priority memory 95 depending on a data type of data that is used in each of uplink slots of the MCG. The maximum transmission power amount memory 94 is an area for storing an allowable maximum transmission power amount that is available to the terminal device 3A for the MCG and the SCG.

The determining unit 97 determines whether it is possible to allocate the excess amount to the other cell group between the MCG and the SCG, on the basis of the priorities of transmission target data of the MCG and the SCG, the allowable maximum transmission power amounts, the first excess amount of the MCG, and the second excess amount of the SCG. A timing to determine the allocation of the excess amount is started depending on approval (grant) by the cell group, for example.

For example, it is assumed that the terminal device 3A transmits URLLC data by using a mini slot B+1 of the SCG, and transmits eMBB data by using a slot A of the MCG. Then, if the first excess amount is contained in the transmission power amount of the slot A of the MCG within the allowable maximum transmission power amount at the timing of the mini slot B+1 of the SCG, the first excess amount of the MCG is allocated to the transmission power amount of the mini slot B+1 of the SCG. The fourth control unit 85D adds the first excess amount of the MCG to the transmission power amount of the mini slot B+1 of the SCG. As a result, it is possible to ensure a large transmission power amount for the URLLC data at the timing of the mini slot B+1 of the SCG, so that stable transmission power can be ensured.

Figure 14:
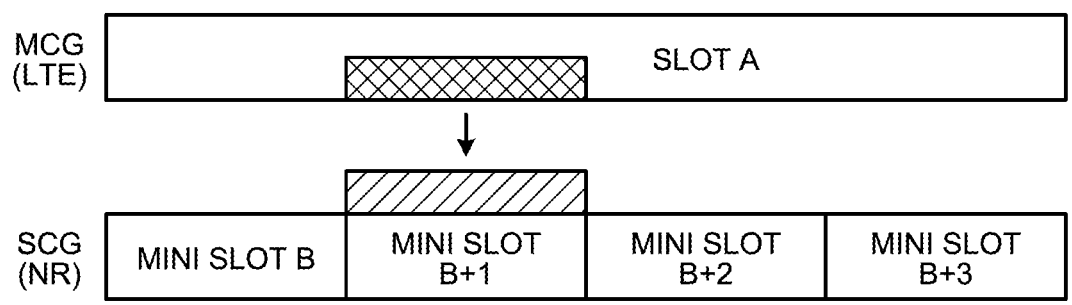
FIG. 14 is an explanatory diagram illustrating an example of a relationship between a transmission power amount of a slot of an LTE cell group and a transmission power amount of a slot of an NR cell group.

For example, assuming that the MCG is an LTE cell group and the SCG is an NR cell group, a relationship between the transmission power amount of the slot of the LTE cell group and the transmission power amount of the slot of the NR cell group will be described. FIG. 14 is an explanatory diagram illustrating an example of a relationship between the transmission power amount of the slot of the LTE cell group and the transmission power amount of the slot of the NR cell group. For example, it is assumed that the eMBB data is used by the slot A of the LTE cell group of the MCG, and the URLLC data is used by the mini slot B+1 of the NR cell of the SCG. It is assumed that the determining unit 97 determines that the first excess amount is contained in the transmission power amount of the slot A of the LTE cell group within the allowable maximum transmission power amount at a timing of the mini slot B+1 of the NR cell group. In this case, the fourth control unit 85D allocates the first excess amount of the slot A of the LTE cell group to the transmission power amount of the mini slot B+1 at the timing of the mini slot B+1 of the NR cell group. As a result, the terminal device 3A is able to increase the transmission power amount of the mini slot B+1, so that it is possible to stably output the URLLC data by the mini slot B+1.

Figure 15:
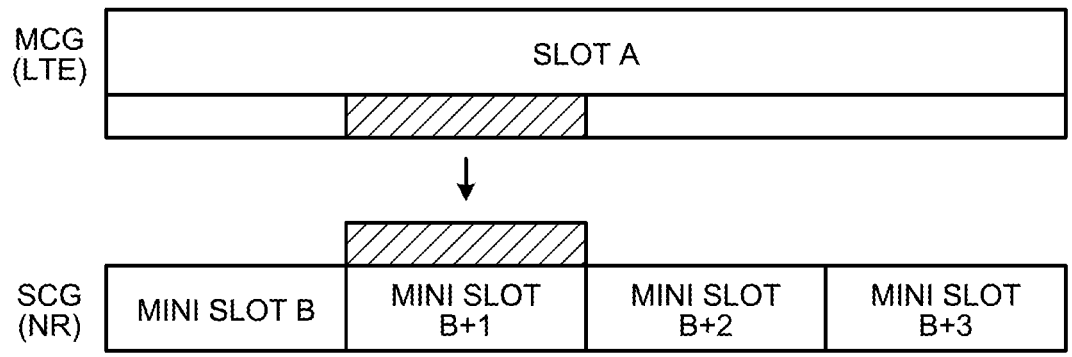
FIG. 15 is an explanatory diagram illustrating an example of a relationship between the transmission power amount of the slot of the LTE cell group and the transmission power amount of the slot of the NR cell group.

FIG. 15 is an explanatory diagram illustrating an example of a relationship between the transmission power amount of the slot of the LTE cell group and the transmission power amount of the slot of the NR cell group. It is assumed that the terminal device 3A detects a request for transmitting the URLLC data using the mini slot B+1 of the NR cell group while allocating the second excess amount from the slot of the NR cell group to the slot A of the LTE cell group, for example. In this case, it is assumed that the determining unit 97 determines that the first excess amount is contained in the transmission power amount of the slot A of the LTE cell group within the allowable maximum transmission power amount at the timing of the mini slot B+1 of the NR cell group. In this case, the fourth control unit 85D allocates the second excess amount of the slot of the LTE cell group to the transmission power amount of the mini slot B+1 at the timing of the mini slot B+1 of the NR cell group. As a result, the terminal device 3A reduces the transmission power amount of the slot of the LTE cell group at the timing of the mini slot B+1. The terminal device 3A allocates the first excess amount that is obtained by the reduction to the transmission power amount of the mini slot B+1 in order to increase the transmission power amount, so that it is possible to stably output the URLLC data by the mini slot B+1.

In the fourth embodiment as described above, the priority of the URLLC data is set to be higher than the priority of the eMBB data; however, data types are not limited to two, and various modifications may be made. For example, priorities may be set among three or more data types. Further, while the data type is described as one example for determining the priorities, various modifications may be made. For example, it may be possible to distinguish data by a channel type, a traffic type, uplink control information (UCI), or the like.

While the wireless communication system 1D in which the MCG is the LTE cell group and the SCG is the NR cell group has been described as an example for convenience of explanation, various modifications may be made. For example, a wireless communication system in which the MCG is the NR cell group and the SCG is the LTE cell group may be adopted. Further, a wireless communication system in which the MCG and the SCG are NR cell groups may be adopted.

According to one embodiment, it is possible to control uplink transmission power in accordance with a next generation communication carrier.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
processor circuitry configured to:
perform dual connectivity with a cell group and a different cell group,
control transmission power sharing between the cell group and the different cell group which is adopted in a synchronous LTE-NR DC scenario,
calculate a first transmission power amount of the cell group with reference to parameters including number of resources block, path loss and a configured maximum output power which is notified using a radio resource control (RRC) signaling from a first radio base station and a second transmission power amount of the different cell group with reference to parameters including number of resource block, path loss, and the configured maximum output power which is notified using a radio resource control (RRC) signaling from a second radio base station, and
when transmissions of the cell group overlap in time with transmissions of the different cell group and a total amount of the first transmission power amount of the cell group and the second transmission power amount of the different cell group during the overlapping time is larger than a configured maximum transmission power amount, a transmission power amount of a slot that is used for transferring data using the uplink toward the cell group or a transmission power amount of a slot that is used for transferring data using the uplink toward the different cell group during the overlapping time such that the total amount of the transmission power amount of the cell group and the transmission power amount of the different cell group is less than or equal to the configured maximum transmission power amount, and
a receiver configured to receive a signal on the cell group and the different cell group.

2. The terminal device of claim 1, wherein each of the cell group and the different cell group uses either long term evolution (LTE) radio access or new radio (NR) radio access.

3. The terminal device of claim 2, wherein the overlapping time consists of a portion of slot.

4. A radio base station of a cell group, the base station comprising:
the base station that communicates with a user terminal by employing dual connectivity with a different cell group different from the cell group, the radio base station comprising:
- a transmitter configured to transmit radio resource control (RRC) signaling that includes parameters including number of resource block, path loss and a configured maximum output power, for calculating a first transmission power amount, one of the parameters being a first maximum guaranteed power amount that is available for uplink toward the different cell group; and that includes parameters including number of resource block, path loss and a maximum output power, for calculating a second transmission power amount, one of the parameters being a second maximum guaranteed power amount that is available for the uplink toward the cell group and for allocating the second amount to a transmission power amount of a slot that is used for transferring data using the uplink toward the cell group, if the second amount is contained in the slot for the uplink toward the different cell group when data is transferred using the uplink toward the cell group; and
- a receiver configured to receive a signal for reduced transmission power amount of the cell group overlapping in time with transmission in a slot that is used for transferring data using the uplink toward the different cell group.

5. The radio base station of claim 4, wherein each of the cell group and the different cell group uses either long term evolution (LTE) radio access or new radio (NR) radio access.

6. The radio base station of claim 5, wherein the overlapping in time consists of a portion of slot.

* * * * *